Jan. 30, 1968 R. E. WHITE ETAL 3,366,885

SWITCHING SYSTEM COMPRISING LOW GAIN, ELECTRON-BEAM COUPLED HELICES

Filed Dec. 4, 1963 3 Sheets-Sheet 1

INVENTORS
RICHARD H. GEIGER
ROGER E. WHITE

BY Blair E. Buckles

ATTORNEYS

INVENTORS
RICHARD H. GEIGER
ROGER E. WHITE
BY
Blair E. Buckles
ATTORNEYS

Jan. 30, 1968

R. E. WHITE ETAL

SWITCHING SYSTEM COMPRISING LOW GAIN, ELECTRON-BEAM COUPLED HELICES 3,366,885

Filed Dec. 4, 1963

3 Sheets-Sheet 3

INVENTOR.
RICHARD H. GEIGER
ROGER E. WHITE

BY Blair & Buckles

ATTORNEYS

United States Patent Office 3,366,885
Patented Jan. 30, 1968

3,366,885

SWITCHING SYSTEM COMPRISING LOW GAIN, ELECTRON BEAM COUPLED HELICES

Roger E. White, Ridgefield, and Richard H. Geiger, Stamford, Conn., assignors, by mesne assignments, to Microwave Associates, Inc., a corporation of Massachusetts Continuation-in-part of application Ser. No. 58,740, Sept. 27, 1960. This application Dec. 4, 1963, Ser. No. 327,923
7 Claims. (Cl. 328—153)

This invention relates to a method and apparatus for controlling the amplitude of radio frequency signals over a broad range of frequencies. More specifically, it relates to a novel broad band, velocity-modulated electron beam coupling device for radio frequency signals; to novel and improved communication systems incorporating the device, and to the signal control method practiced by the coupling device. The present application is a continuation-in-part of pending application Ser. No. 58,740, filed Sept. 27, 1960 (now abandoned) for "Electron Beam Coupled Switch" and assigned to the same assignee.

A coupling device embodying the invention is operable, for example, in microwave systems as a high speed electronic switch having negligible phase delay between input and output ports, as a limiter, as an isolator, as a modulator and as a multicoupler. A plurality of these functions are often available simultaneously with the same equipment. A further feature of the coupling device of the invention is its inherent freedom from oscillation. Moreover, it is suited for rugged construction at relatively low cost.

Heretofore achieving the foregoing functions required a complex of bulky and costly electronic apparatus. Moreover, many characteristics of the prior art equipment, such as slow response time and non-linearity, are undesirable in many communication systems.

For example, in a radio monitoring system having a receiver tuned to a selected channel, extremely feeble signals are often intercepted. These weak signals require high amplification, hence the system uses a sensitive receiver. Moreover, intercepted unmodulated or carrier signals have to be modulated before the receiver can respond to them.

In the event that a strong signal is intercepted, as occurs when the operator of the monitoring station operates his transmitter, the input stages of the receiver are subjected to signals of excessive strength. These signals can damage the receiver, rendering it inoperative.

In the prior art, to satisfy these varied operating requirements, such monitoring systems include a modulator for modulating intercepted carrier signals prior to applying them to the receiver.

Apparatus is also provided for selectively isolating the receiver from the antenna. Preventing signals of excessive strength from damaging the receiver, without completely blocking them out, requires still further equipment, in addition to the control devices required to select which of the foregoing units are required at each instant in response to the signal being intercepted.

Accordingly, it is an object of the present invention to provide an improved method and apparatus for controlling the amplitude of radio frequency signals. A further object is to provide such a method and apparatus characterized by relatively uniform operation over a wide range of frequencies.

Another object of the invention is to provide a radio communication system in which the amplitude of radio frequency signals, and particularly of received signals, can be selectively controlled.

Another object of the invention is to provide a method and apparatus for automatically protecting a receiver from damage by strong signals, with minimal interruption of communication. A further object is to provide such a method and apparatus that is also operable to modulate the incoming signal.

Another object of the invention is to provide a signal control method and apparatus of the above type characterized by negligible phase delay and by fast response.

It is also an object of the invention to provide a wide band radio frequency limiter. Moreover, it is an object to provide such a limiter that is operable also as an isolator.

A further object of the invention is to provide a radio frequency switch characterized by readily controllable remote operation and fast rise and fall times.

Another object of the invention is to provide apparatus for efficiently modulating a radio frequency signal. A more specific object is to provide relatively simple modulating apparatus that also performs the above switching, limiting and isolating functions.

Yet another object of the invention is to provide apparatus of the above character that has a small space requirement, high reliability, low operating power consumption and is characterized by great physical ruggedness.

Other objects of the invention will in part be obvious and will in part appear hereafter.

The invention accordingly comprises the several steps and the relation of one or more of such steps with respect to each of the others and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description, taken in connection with the accompanying drawings in which.

*General description*

Figure 1:
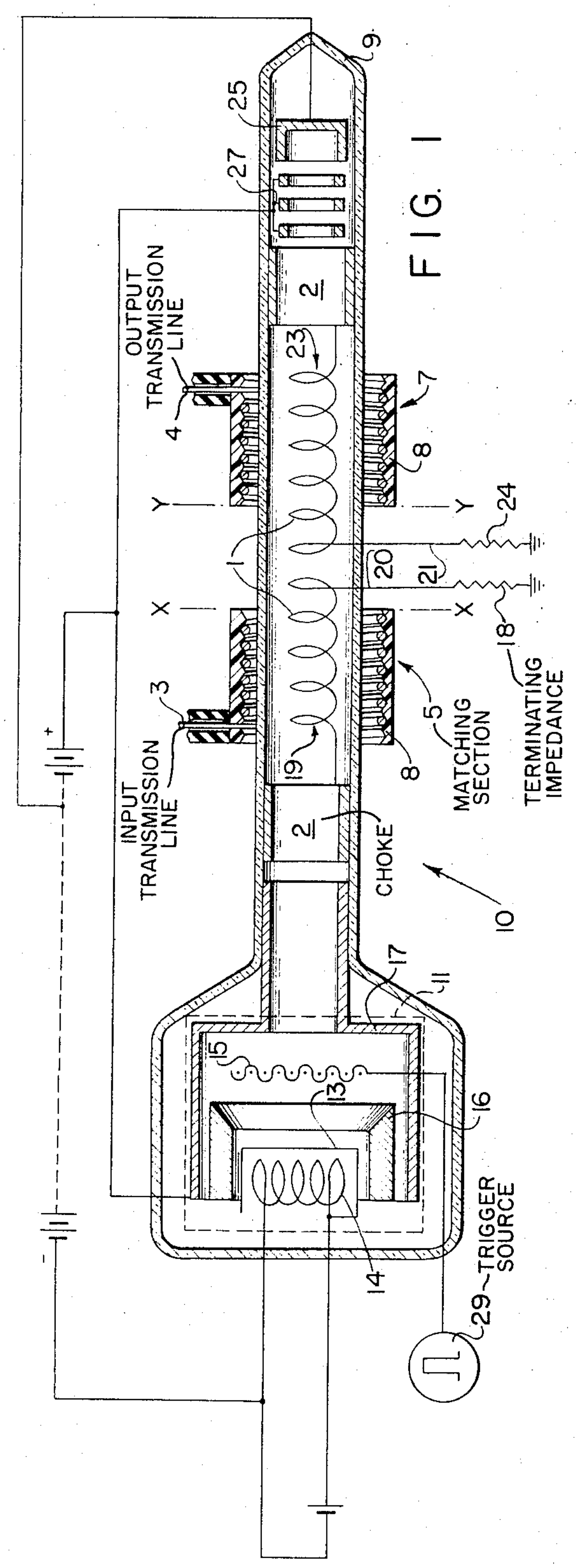
FIGURE 1 is a schematic representation of a coupling device embodying the invention.

In general, a coupling device embodying features of the invention comprises a velocity-modulated electron beam device having a plurality of isolated coupler structures, or slow wave circuits, arranged to be closely coupled by the electron beam. In such a coupling device having an input coupler and an output coupler, the electron beam impresses the signal applied to the input coupler on the output coupler. The device performs the coupling with some gain so that when feeble signals are applied to the input coupler, the input signals are impressed with substantial amplitude on the output coupler. However, the coupling device limits high power signals applied to the input coupler to impress them on the output coupler with smaller power. When the electron beam is at full coupling amplitude, the device couples all signals within its bandwidth from the input to the output coupler with no loss.

When the electron beam is OFF (not present), the couplers are isolated from each other. This allows the coupling device to be used, for example, as an isolator and as a switch. For operation as a pulse modulator, a control grid in the coupling device is repetitively pulsed, turning the electron beam OFF and ON, to impress on the output coupler a pulse-modulated facsimile of the input signal. The coupling device performs this switching or gating operation with extremely rapid response.

In a coupling device made according to the invention and having two couplers, the time interval of cumulative interaction of the electron beam with the output coupler is controlled to provide nominal overall gain, often substantially unity gain. Such control is advantageously affected with a short output coupler, as hereinafter disclosed. The electron beam velocity is generally maintained as a fixed parameter.

Accordingly, in practicing the invention, one suitably determines the design, including length, of the input and the output couplers, which suitably can be the slow-wave structure as used in a traveling wave amplifier tube or the fast-wave structure of a Crestatron-type traveling wave tube, to provide the desired coupling. The resultant coupling device has a remarkably short slow-wave circuit or coupler structure. The output signal has relatively negligible time delay with respect to the input signal. Further, the dispersive effects of the coupling device are minimized to attain negligible phase distortion between the electron coupling beam and the electromagnetic wave on the input coupler with which it interacts. Moreover, the interaction bandwidth of the novel coupling device is extremely broad, thus providing output pulses of ultra-fast rise times. The coupling device is not susceptible to oscillations, and hence its manufacturing tolerances are not as critical as those demanded of the prior art velocity-modulated electron beam devices.

Further, and in accordance with another feature of this invention, the input and output couplers of the novel coupling device each constitute an active signal transmission path. Radio frequency signals can be directed through the coupling device and along one such transmission path, i.e., the input coupler, to a first output device and can be coupled simultaneously by the velocity-modulated electron beam along the other of such transmission paths, i.e., the output coupler, to a second output device. The radio frequency signal is coupled to the second output device only during the presence of the electron beam; during this time, the input coupler functions both as a transmission path for radio frequency signals to the first output device and as an apparent source of the radio frequency signals coupled to the second output device.

During the absence of the electron coupling beam, the input coupler functions only as a transmission path directing signals to the first output device. The input coupler, i.e., the transmission path therethrough, is appropriately terminated when the novel coupling device is employed to deliver signals only to the second output device.

In accordance with still another feature of this invention, the terminals of the input and output couplers can be disposed exteriorally to provide a four-terminal coupling device. With the terminals so disposed, a number of the coupling devices can be arranged for active transmission purposes, for example to switch radio frequency signals at a rapid rate and at high power levels between a plurality of output devices. Also, the overall length of the input/output coupler is further reduced when the input coupler and the output coupler are terminated exteriorally of the coupling device proper.

In the design of velocity modulated electron beam devices of the present type, when the slow-wave circuit is a helix, the overall gain (in decibles) of the device can be expressed as $$G=A+BCN \qquad (1)$$

where:

A is a loss factor, and is hence a negative quantity;
B is an increasing wave parameter, the increasing wave being the one impressed by the electron beam on the slow-wave circuit of the output coupler;
C is a gain parameter; and
N is the length, in wave lengths, of the output coupler slow-wave structure.

This formula and further explanations of its parameters are given in "Traveling Wave Tubes" by Pierce, 1950, published by D. Van Nostrand, Inc. and in "Beam Wave Electronics in Microwave Tubes" by Hutter, published by D. Van Nostrand. Equation 1, for example, is found in Pierce as Equation 2.38 and is discussed in detail in Appendix VII.

Conventional traveling wave amplifier tubes are designed to provide high gain, in the order of 20 to 40 db. This requires, among other considerations, a long slow-wave circuit. The resultant long amplifier tube structure is fragile and requires a high accelerating voltage for the electron beam. Furthermore, substantial heat is developed at the collector anode terminating the electron beam.

The time required for a signal to travel through a conventional traveling wave amplifier results in a substantial phase delay of the output signal with respect to the input signal. Focusing the electron beam in conventional traveling wave amplifier tubes is also a problem.

Perhaps the most difficult problem in designing conventional traveling wave amplifiers is to obtain precise impedance matching in the tube structure to avoid oscillations. Some signal is generally always reflected back along the traveling wave amplifier tube by the load it is connected with. If a reflected signal does not find a perfect impedance match in the traveling wave amplifier tube, it will be reflected back toward the load and subjected to substanial amplification, a gain of 1,000 for example, before leaving the amplifier tube. This amplification of reflected energy rapidly generates oscillations in the tube. Avoiding such oscillations with conventional traveling wave amplifiers requires that the large structure be constructed with exceedingly close tolerances precisely held to minimize the impedance discontinuities. Such manufacture is costly. Many prior art tubes accordingly employ lossy dissipative structures to absorb the reflected signals.

Still considering the prior art traveling wave velocity-modulated devices, those constructed to have nominal gain were heretofore constructed with the loss factor A, as set forth in Equation 1, having a large value and the gain factor C being small. We have found that by thus adjusting A and C to provide unity gain with a conventional traveling wave amplifier tube, as for example having N equal to 45, does not provide the results, such as fast response time, minimal delay, low operating power and temperature, and substantial frequency independence, of the present coupling device. Further advantages of the coupling device of the invention are its freedom from oscillation and its relatively low cost, rugged construction and ease of fabrication.

The present coupling devices are designed on a different basis from the conventional traveling wave amplifier tubes and traveling wave nominal gain tubes discussed above. More specifically, we have found that a new coupling device can be achieved with a velocity-modulated electron beam structure that is designed with a small or minimal value for the loss factor A, and a maximum gain factor C, referring to Equation 1. In a typical design where the velocity-modulated coupling structure has one input and one output slow-wave circuit or coupler, the input slow-wave circuit may be five wavelengths long at the central operating frequency and the output slow-wave circuit constructed with a length of 15 wavelengths.

Shorter couplers may also be used, for example another coupling device embodying the present invention utilizes an input coupler one and one-half wavelengths long.

The resultant structure designed on this basis has relatively negligible phase delay between the input and output signals, and is inherently incapable of oscillating. The overall coupler structure is many times shorter than those in conventional traveling wave amplifiers, e.g., two inches as compared to one foot or more. This remarkably short length allows the coupling device to be constructed, where desired, at relatively low cost with precise tolerances not feasible in the longer, prior art devices. However, inasmuch as the present coupling devices cannot sustain oscillations, their construction cost is further reduced since no stringent impedance matching is required.

The gain of these coupling devices is nominal, generally being around unity and seldom attaining more than 3 to 5 db. A further advantage of the present invention is that the coupling device operates with a markedly lower accelerating voltage than conventional traveling waves structures, and markedly less heat is generated in the coupling devices collector.

*Coupling device structure*

Referring now to FIGURE 1, a coupling device indicated generally at 10 has a slow-wave structure 1, suitably constructed as a pair of closely spaced coaxial helical wire coils, the opposite ends of which are connected to and positioned by coil terminating members or "chokes" 2 beyond matching sections indicated generally at 5 and 7. As hereinafter employed, the helical structure 1 includes an input coupler 19 and an output coupler 23.

Figure 5:
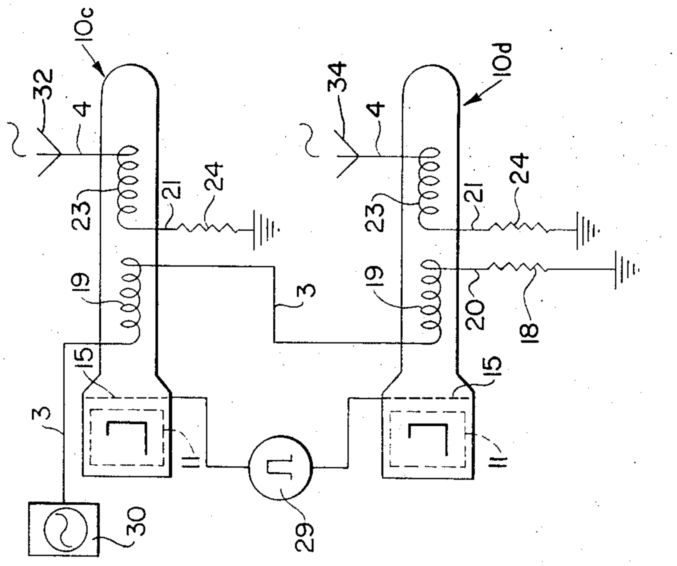
FIGURES 4 and 5 are diagrammatic representations of switching systems embodying the invention.
Figure 4:
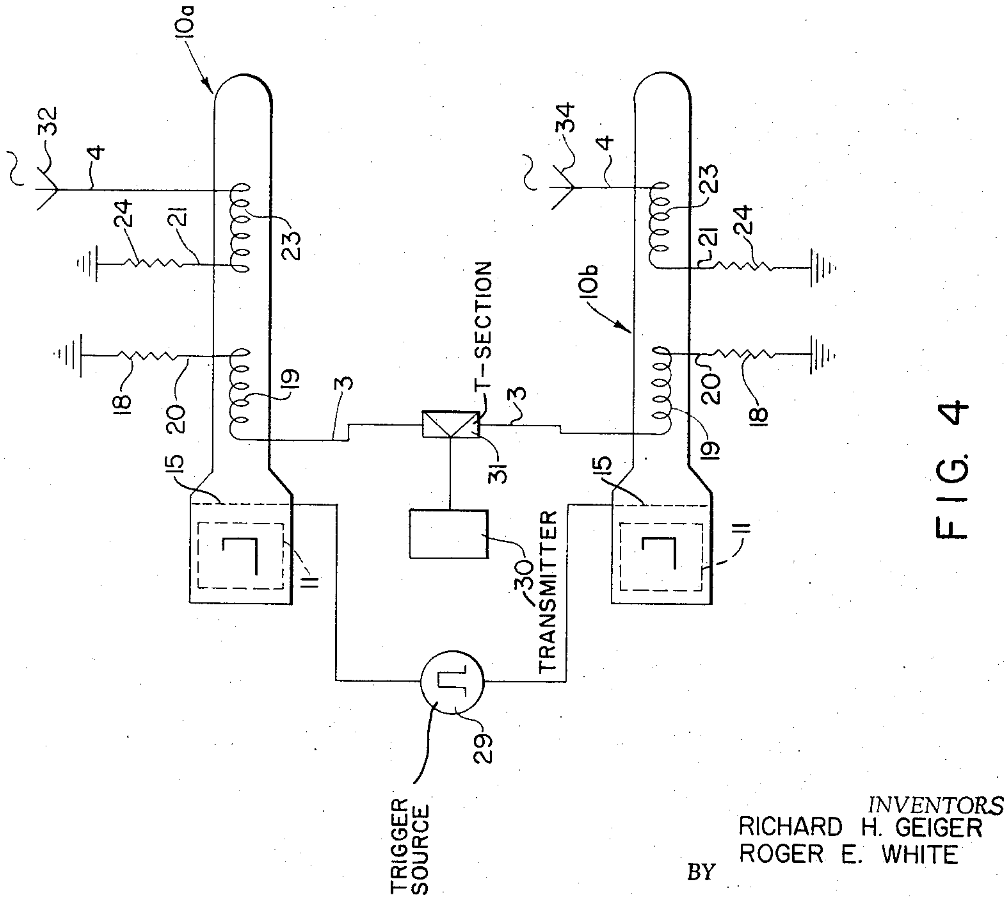

A coaxial transmission line 3, for delivering a radio frequency signal to the input coupler 19, is connected to the input end of the coupling device 10 by a matching section 5. An output coaxial transmission line 4 is connected to the output end of the coupling device 10 by a matching section 7. Each matching section 5 and 7 comprises an external helix which, in the embodiment shown, is suitably wound in a threaded polytetrafluoroethylene plastic sleeve 8 and externally disposed on a glass envelope 9 coaxial with the internal helical structure 1 and electromagnetically coupled thereto. The helices of the matching sections 5 and 7 appropriately are electrically integral with the ends of the coaxial transmission lines 3 and 4, respectively. In one of many alternative structures of the present coupling device, the ends of the helical structure 1 may be electrically connected directly to the coaxial transmission lines 3 and 4 through the envelope 9 as shown in FIGURES 4 and 5.

The envelope 9 of the coupling device is advantageously glass (preferably of metal-ceramic type), and is evacuated. Within the envelope 9, near the input end of the coupling device 10, is an electron gun structure 11 having an electron emitting cathode 13, a heater 14, a control grid 15, a focusing electrode 16 and an accelerating electrode or anode 17. Also within the envelope are the input coupler 19 axially aligned with but electrically isolated from the output coupler 23. The electron beam from the gun 11 passes concentrically through the couplers 19 and 23. At the output end of the envelope 9, opposite the electron gun structure 11 and beyond the output coupler 23, are a collector electrode 25 for collecting the electron beam and decelerating electrodes 27.

Disposed about the envelope 9 is a conventional electron beam focusing structure (not shown) whose construction is well known in this art. Such focusing confines the electron flow within the desired path as it traverses the length of the helical structure 1. More particularly, the focusing structure is adapted when energized to provide a field of parallel, longitudinal lines of magnetic force to confine the electron coupling beam to a fixed diameter, whereby it does not impinge upon the helical structure 1 as it traverses the length of the tube to the collector electrode 25. Such a focusing field may be established by electrostatic focusing structures or by a so-called "periodic" permanent magnet focusing structure as described in the article, "Lightweight Very-wide-band Integral Package TWT's," by C. Louis Cuccia appearing in the Microwave Journal, July 1960, pp. 47–57.

The input coupler 19 and the output coupler 23 are suitably rigidly supported within the evacuated envelope 9 by any of the well known methods. For example, they may be supported by ridges on the inside surface of the envelope 9. The use of such spaced raised supports minimizes dielectric loading of the helical structure 1 because of the point contacts therebetween. However, if the helical structure 1 is embedded in the raised supports, it will better withstand mechanical vibrations and shocks and maintain a constant or other selected turns-per-inch ratio.

The input coupler 19 and the output coupler 23 are electrically isolated from each other. In the embodiment of FIGURE 1, this is achieved by terminating each coupler 19 and 23 with a matched impedance, shown as the impedances 18 and 24, respectively. Further, as illustrated in FIGURE 1, the input coupler 19 and the output coupler 23 are each active continuous transmission paths through the coupling device, inasmuch as the terminals thereof extend exteriorally of the envelope 9 along the leads 20 and 21, respectively. One transmission path is traced successively through the matching section 5, the input coupler 19 and along the lead 20; another transmission path is traced through the lead 21, the output coupler 23 and the matching section 7.

For operation as a switch, a limiter, an isolator and a modulator, the leads 20 and 21, respectively, are connected to terminating impedances 18 and 24, preferably matched to the characteristic impedances of the couplers 19 and 23 respectively. With the terminating impedances 18 and 24 exterior of the housing 9, heat generated therein can readily be dissipated by known means without detracting from the operation of the coupling device. It should be understood that when desired, internal terminations can also be used for the couplers 19 and 23.

Figure 2:
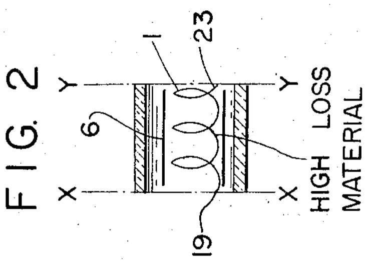
FIGURE 2 is a fragmentary side elevation view, in axial section, corresponding to the mid-portion of the FIGURE 1 coupling device between the lines XX and YY and showing an alternative construction for electrically isolating the input and output couplers.

Alternatively, the isolation between the couplers 19 and 23, provided in the FIGURE 1 embodiment by the matched terminating impedances 18 and 24, may be advantageously achieved with an attenuator structure disposed intermediate the couplers. FIGURE 2 shows such an attenuator structure 6 that enables the couplers 19 and 23 to be formed as one continuous helix. The attenuator structure 6 can advantageously provide isolation of approximately 60 db and may, for example, be formed of a high loss material, e.g., a graphite coating from aqueous dispersion (Aquadag), or a carbon layer, in contact between the input coupler 19 and the output coupler 23 with a portion of the continuous slow-wave helical structure 1. Thus, coupling between the input coupler 19 and output coupler 23 is again restricted to the electron beam.

The electron "gun" anode 17, the focusing electrode 16, the relical structure 1, the helix terminating members 2, the decelerating electrode 27 and the collector electrode 25 are biased positively with respect to the cathode 13 so that the electron coupling beam is projected through the helical structure and collected at the output end by anode 25.

Biasing the control grid 15 sufficiently negative blocks the electron beam. During such an OFF condition, a trigger source 29 applies an inhibiting voltage to the control grid 15 which inhibits passage through the anode 17 of electrons emitted from the cathode 13. In the ON condition, such electrons instead of being repelled by the grid 15 pass through it and centrally through the helical structure 1 to the collector anode 25. The trigger source 29, though shown as a square-wave generator, is illustrative of various triggering and like control devices which may appropriately be employed.

When the electron beam is inhibited, no coupling (discussed below) occurs between the input coupler 19 and the output coupler 23 and therefore substantially no output signal appears along the coaxial transmission line 4 even when a signal is applied to the input coupler 19. More specifically, in the absence of a coupling electron beam, the couplers 19 and 23 are isolated from each other by around 60 db, as mentioned above. When the trigger source 29 transfers the coupling device to the ON condition, the electron beam couples to the output coupler 23 the signal applied to the input coupler 19. This output signal is imposed on the coaxial transmission line 4 through the agency of the matching section 7.

A valuable characteristic of coupling devices embodying this invention is the short, insignificant, time delay between application of an input signal to coupler 19 and arrival of the output signal at coupler 23. This is achieved by limiting the drift space between the input coupler 19 and the output coupler 23 to less than one full turn of the helix structure 1. Also the length of both the input and output couplers is very short, of the order only of 1½ wavelengths of the mid-band frequency at which the device is designed to operate. Moreover, the device has rapid response to the control or gate signal applied to the control grid 15. Thus, when the control grid is pulsed ON and then OFF the coupling device provides an output pulse having fast rise and fall times. In conventional traveling wave amplifier tubes, by comparison, delay of the output pulse after application of a triggering signal is excessive, generally being at least an order of magnitude greater.

*Operation*

Turning to the operation of the coupling device of the present invention, a radio frequency signal directed along the coaxial line 3 to the matching section 5 is electromagnetically coupled to the input coupler 19 and directed along the turns thereof, defining an active transmission path, to produce a wave having a longitudinal electric field axially through the helical structure. The velocity of the electric field so generated is less than free space velocity and approximates the velocity of light multiplied by the ratio of the pitch to circumference of the slow-wave helical structure 1. The signal so directed along the input coupler 19 is effectively dissipated by the terminating impedance 18 exteriorally of the envelope 9 and, therefore, is isolated from the output coupler 23.

The electron beam velocity is advantageously determined, by the voltage on the accelerating electrode 17, to be in synchronism with the longitudinal component of the input signal electric field along the input coupler 19. A cumulative interaction then takes place between the moving axial electric field and the electrons in the beam.

During passage through the input coupler 19, the electron beam is density or velocity-modulated and appears as axially spaced "bunchings" of electrons. The modulated electron beam passes on to the output coupler 23 where it induces an output wave similar to the input wave developed on input coupler 19 by the R.F. signal applied thereto. This output wave increases along the coupler 23, extracting energy from the electron beam. In this manner, an output signal corresponding to the input signal develops on the output coupler 23. The continuance of the output signal along the coaxial transmission line 4 is dependent on the continuance of the modulated electron beam within the output coupler 23.

The length of the helical structure 1, and more particularly the length of the output coupler 23, is advantageously determined so that the output power level is equal to the input power level. Further, for use in switching and multicoupling systems, the length of the input coupler 19 is preferably selected so that signal at the lead 20 has substantially the same level as the input signal to the coupler 19.

Figure 3:
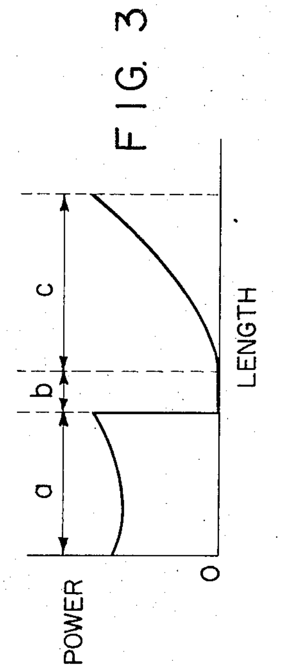
FIGURE 3 is a graph showing the relative power levels along the successive zones of the input/output couplers of the coupling device of FIGURE 1.

FIGURE 3 represents a power graph illustrating the variations in power levels on the helical structure 1 as a function of distance therealong. The power level of the signal delivered to the input coupler 19 initially decreases, as shown in the graph section A, due to transfer of signal power from the coupler 19 to the electron beam. This interaction of the beam with the input coupler modulates the velocity of the beam electrons according to the input signal amplitude. The velocity modulation results in bunching of the electrons in the beam. Further interaction of the bunched, velocity-modulated electron beam with the coupler 19 increases the power level of the signal thereon, as seen in the right end of the FIGURE 3 graph section A. The axial length of the input coupler can hence be selected to obtain the desired signal level at its terminating lead 20.

The R.F. signals on the input coupler 19 are then dissipated in the terminating impedance 18 and the power level is reduced toward zero as illustrated in section B of the FIGURE 3 graph. Section B corresponds to the small spatial separation between the input coupler 19 and the output coupler 23 in the envelope 9. For the construction of FIGURE 2, it corresponds to the axial region of the attenuator structure 6 and is preferably less than the axial space required for one full turn of the helix 1.

The modulated electron beam continues through the very short gap or drift space between couplers 19 and 23, or the attenuator structure 6 of FIGURE 2, to coupler 23 and thence to the collector electrode 25. Coupling between the field of the electron beam and the output coupler 23 induces on the coupler 23 a signal having the same frequency and amplitude characteristics as the input signal. The power level of this output signal increases exponentially with the length of the coupler 23, as seen in section C of the FIGURE 3 graph. Reference is made to "Traveling-Wave Tubes" by J. R. Pierce, published by D. Van Nostrand Company, Inc., 1950, for further information.

According to a further feature of the present invention, the length of the output coupler 23 is effectively determined at the output end at that point where the output power level is substantially equal to the input power level, i.e., the coupling device has a nominal overall gain, generally a unity gain.

The bandwidth of the present coupling device is determined primarily by the phase relationship of the electric wave traveling along the helical structure 1 and the velocity of the electron coupling beam directed therethrough. Although velocity-modulated electron beam devices are inherently broadband, they exhibit a gradual change of gain with frequency. This change is determined, in part, by the range over which the electron beam keeps step, or is synchronized, with the electric wave, i.e., by the dispersiveness of the helical structure 1. However, with the short input and output couplers 19 and 23 of the present device, this dispersive effect is maintained at a low, effectively negligible, level over a markedly broad frequency range. As a result, the present coupling device has greater bandwidth, and faster response, than prior velocity-modulated electron beam devices. A coupling device embodying the invention, for example exhibits a gain or coupling variation of less than 2 db, for uniform input signal, over a 5,000 megacycle bandwith centered at 4,500 megacycles and another such device operating at a central frequency of 16,000 megacycles has a similar effective range of 11,000 megacycles.

The amplification or coupling coefficient for each frequency component of the input signal is also a function of the above in-phase relationships. In the present coupling device 10, the short helices of the input coupler 19 and more especially of the output coupler 23 result in uniform coupling for the frequency components of the input signal over a wide frequency range. Both low and high frequency components, therefore, are induced with corresponding amplitudes along the output coupler 23. Accordingly, the rise and fall times of output pulses is decreased and, also, plateau flatness thereof affected. For example, where the length, N (in wave lengths) of a helical structure is equal to forty-five times the wavelength of the R.F. signals, rise times in the order of $10^{-9}$ seconds have heretofore been achieved. However, in the present coupling devices, the length N of the helical structure 1 (FIGURE 1) may be 15, for example. We have found that this construction decreases these rise and fall times at least by a factor of 10, to $10^{-10}$ seconds. Concurrently, the time delay of the output pulse is reduced by a factor of ⅔ compared to prior art traveling wave devices.

According to a further feature of the present novel coupling devices, secondary electrons appearing at the collector anode 25 have a relatively negligible affect on the electron beam. As a result, the coupling devices are suitably adapted for depressed collector operation. The efficiency of traveling wave tubes in terms of power dissipation is given by the product of electron beam current and the operating voltage of the collector anode 25. If the electron beam is collected at full velocity, great heat is generated at the collector anode 25 and must be dissipated. However, as the present coupling device is not susceptible to oscillations, the collector anode 25 can be operated at a reduced, depressed, voltage, and the decelerating electrode 27 employed.

The decelerating electrode 27 suitably comprises a multi-section hollow structure which is biased, as illustrated, to decelerate and, also, to defocus the electron beam so that the incident velocity of such beam on the collector anode 25 is reduced. Accordingly, not only is less heat generated at the collector anode 25 but, also, it may be operated at depressed voltages, substantially below the voltages appearing on the helical structure 1. With this operation, the collector anode of the coupling device draws relatively little D.C. operating power. At the same time, a high efficiency, as defined by the ratio of R.F. power output to D.C. beam power, is realized.

In addition to the markedly improved and simplified switching, coupling, and controlled isolating functions performed by the present coupling devices, they can also provide efficient limiting operation. Referring again to FIGURE 1, when the input signal applied to the coupler 19 is sufficiently large, it will saturate the electron beam. Thereafter, a higher power input signal has no greater effect on the saturated beam, i.e., the bunching or modulation of the beam is not increased. When the coupling device is thus saturated, the output signal the beam impresses on the output coupler 23 is limited. A larger input signal does not result in a larger output signal.

*Switching networks*

FIGURES 4 and 5 illustrate switching arrangements utilizing the present coupling devices. To facilitate a description of these switching arrangements, the same reference characters hereinabove employed for the description of FIGURES 1 are employed to identify corresponding elements.

FIGURE 4 shows two coupling devices 10*a* and 10*b* operating as ON-OFF devices to effect, for example, a time-sharing by antennas 32 and 34 of an R.F. signal generated by a transmitter 30. The transmitter 30 delivers the R.F. transmitter signal to a 3 db power divider or T section 31. The power divider 31 distributes the signal between the input couplers 19, herein illustrated as extending exteriorally of the envelopes 9 to direct electrical connection with the coaxial transmission lines 3—3. Accordingly, the transmitter signal is delivered equally to each parallel-connected input coupler 19. The terminating impedances 18 absorb the transmitter signals exiting from the couplers 19.

A trigger source 29 is connected, in the illustrated time-sharing system, to the control grid 15 of each coupling device 10*a* and 10*b* to project the electron beam in the devices in alternate succession. During the presence of the electron beam in one of the coupling devices, the transmitter signal is coupled to its output coupler 23 and then directed along the coaxial transmission line 4 to the associated antenna 32 or 34. Thus, the antennas 32 and 34 are alternately excited at a rapid rate with the transmitter signal. The coupling devices 10*a* and 10*b* each present the same impedance to the T-section 31, and hence to the transmitter 30, when ON as when OFF. By thus avoiding impedance changes as the coupling devices are switched, the transmitter can operate efficiently. Each output coupler 23 is suitably connected along a lead 21 to a terminating impedance 24 to dissipate any reflected waves which may be directed therealong.

The respective output couplers 23 of the coupling devices 10*a* and 10*b* can readily be constructed to provide a 3 db gain, so that the R.F. signal delivered to the antennas 32 and 34 has the same power level as generated by the transmitter 30.

FIGURE 5 illustrates another switching arrangement in which the above-described coupling devices can be advantageously employed. As illustrated, the input couplers 19 of a number of coupling devices 10*c* and 10*d* are tandemly arranged along the coaxial lines 3—3 to provide a single transmission path for the R.F. signal from the transmitter 30. The last tandemly arranged input coupler 19, e.g., that of the coupling device 10*d*, is connected along the lead 20 to the impedance 18 to provide a matched termination. Accordingly, the R.F. signal appears on each input coupler 19. The output couplers 23 are connected along the leads 21—21 to terminating impedances 24, which effectively dissipate reflected waves. Accordingly, by adapting the trigger circuit 29 to selectively direct enabling potentials to particular ones or all of the control electrodes 15 of the coupling devices 10*c* and 10*d*, the transmitter signal is effectively coupled to the antennas 32 and 34, respectively, via the output couplers 23 and the coaxial transmission lines 4—4. It will be understood that the R.F. signals directed along the coaxial transmission lines 4—4 can be used independently or combined in various ways for a variety of purposes, e.g., to obtain a summation of the powers, or a cancellation of the signals or various combinations thereof. The network shown can be advantageously employed in driving antenna arrays, computer logic circuits, obtaining high power signals, etc.

The above switching systems of FIGURES 4 and 5 are presented only by way of illustration. The present coupling device 10 of FIGURE 1 can now be advantageously applied by those skilled in the art to provide numerous other switching coupling systems.

*Controllable shutter system*

Figures 6, 7:
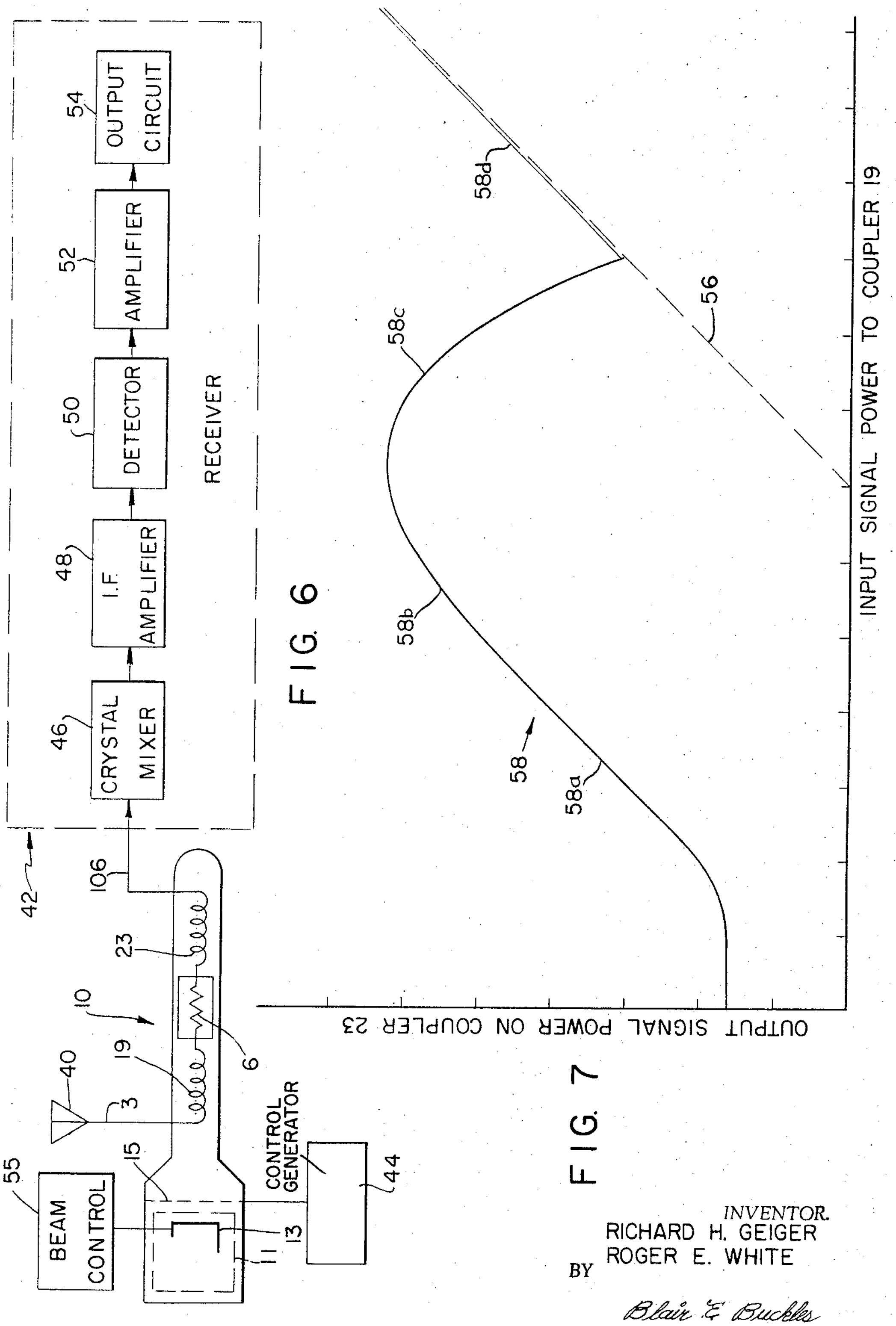
FIGURE 6 is a schematic representation, partly in block form, of a communication system embodying features of the invention.
FIGURE 7 is a graph illustrating the limiting operation, as utilized in the system of FIGURE 6, of the coupler of the present invention.

FIGURE 6 shows a signal-processing system, illustrated as a receiving or channel-monitoring system, employing the coupling device 10 of the invention, as described above with reference to FIGURES 1 and 2, connected between an antenna 40 and a receiver 42. The coupling device 10 performs the multiple functions of (1) protecting the receiver 42 from damage by large amplitude input signals intercepted by the antenna 40, (2) modulating a continuous-wave input signal to make possible its detection, (3) amplifyng feeble signals and (4) selectively isolating the receiver 42 from the antenna 40.

More specifically, the coupling device 10 is constructed as shown in FIGURE 1 with the modification of FIGURE 2 to terminate the couplers 19 and 23 within the coupling device by a matching attenuator structure 6, schematically indicated in FIGURE 6 as a resistor. A control generator 44 is connected to the control grid 15 to control the electron beam projected from the electron gun 11. The antenna 40 is connected to the input end of the input coupler 19 and the output end of the output coupler 23 is connected to the input of the receiver 42, illustrated as a conventional superheterodyne receiver having an input crystal mixer 46.

Although the coupling device 10 can advantageously provide the multiple functions set forth above when connected in front of any signal receiving device, including amplifiers and measuring instruments, in the illustrated embodiment the receiver 42 is shown having a conventional construction wherein the output of the mixer 46 is delivered to an intermediate frequency amplifier 48. A demodulator or detector 50 receives the amplified signal from the IF amplifier and applies a demodulated signal to an amplifier 52 that, in turn, is connected to operate an output circuit 54. The output circuit may, for example, be a loudspeaker, a recorder or an indicating instrument.

Assume that the antenna 40 intercepts a radio frequency wave and in response applies a feeble, small amplitude, radio frequency signal to the input coupler 19. The interaction of the electron beam with the input coupler 19 impresses the input signal on the beam, which couples the signal to the output coupler 23. The output coupler 23, in turn, delivers the signal to the receiver 42. In this manner the communication system operates to couple the intercepted signal directly to the receiver. In a preferred system, the coupling is achieved with a nominal but significant gain of several db, generally less than 10 db, so that the feeble input signal is applied with substantial amplitude to the receiver 42.

Large amplitude waves intercepted by the antenna 40 are similarly applied to the coupling device's input coupler 19 and impressed on the electron beam. However, as discussed above, the D.C. power in the electron beam is adjusted to allow only a limited level of radio frequency power to be coupled to the output coupler 23. This adjustment can be achieved with beam control apparatus 55, appropriately adjusting the temperature to which the heater 14 (FIGURE 1) heats the cathode 13 of the electron gun. The beam control apparatus 55 thus controls the current density of the electron beam. Below the selected level, the electron beam couples input signals to the output coupler 23 with the input and output power levels being substantially linearly related. However, signals on the input coupler with magnitude exceeding the limiting level saturate the electron beam. As a result, the power of the signal impressed on the output coupler 23 is limited to less than that of the original input signal received from the antenna 40. In this manner, the highly sensitive and delicate crystal mixer 46 of the receiver 42 is automatically protected from damage by input signals having excessive power.

In the event that such a large signal were applied to the crystal mixer, the crystal therein would be destroyed, rendering the receiver inoperative. The present invention automatically obviates this critical problem encountered with prior art communication equipment. It should be noted that the protective action occurs before the high power signal reaches the receiver; the limiting action is not impressed in response to receipt of excessive signals at the receiver.

Receiving equipment such as the heterodyne receiver 42 cannot respond to an unmodulated continuous wave radio frequency signal. In the event that a continuous wave is intercepted by the antenna 40, the operator of the monitoring system shown in FIGURE 6 can readily receive the signal by switching the control generator 44 to apply a pulsating voltage to the control grid 15 of the coupling device 10. The pulsating grid bias repetitively turns the electron beam ON and OFF at a rapid rate. This has the effect of coupling to the output coupler 23 a pulse-modulated facsimile of the continuous wave radio frequency signal the antenna 40 delivers to the coupling device. The receiver 42, in turn, responds to such a pulse-modulated signal. The feeble-signal gain and large-signal limiting action described above also occur when the coupling device is thus pulsed to modulate the input signal.

In still another mode of operation with the system of FIGURE 6, when the coupling device 10 is off, in that there is no electron beam coupling the input and output couplers 19 and 23, the receiver 42 is fully isolated from signals intercepted by the antenna 40. This mode of operation is desirable, for example, to prevent the receiver 42 from responding to selected signals, such as those transmitted on other equipment by the operator of the system illustrated in FIGURE 6.

The coupling operation, particularly the limiting aspect thereof, of the coupling device 10 can be further explained with reference to FIGURE 7, a graph of the power output from the coupler 23 plotted in db as a function of the input power applied to the input coupler 19. In the portion 58*a* of the curve 58, corresponding to small input signals, the graph indicates that the coupling device has substantial gain. As the input signal power increases, to the curve portion 58*b*, the output power increases at a decreasing rate, indicating that the coupling device's gain decreases. As the input signal power increases further to the curve portion 58*c*, the output level decreases, as a result of the limiting action that results when the electron beam is saturated. The limiting or atttenuation increases to about 60 db, and as the input power increases further along the curve portion 58*d*, the output signal increases linearly with a constant attenuation of the maximum level, illustratively 60 db. This maximum attenuation is the same as the isolation, plotted along line 56, between the couplers 19 and 23 when no electron beam is present.

Thus, by way of illustration, a coupling device constructed according to the present invention can provide a gain of say 10 db for extremely feeble signals, such as $10^{-9}$ watts, on the coupler 19. The gain will then decrease to a unity value for an input signal of approximately one milliwatt ($10^{-3}$ watts). Thereafter, the coupling device commences operating as a limiter so that larger amplitude signals are applied with smaller power levels in the output coupler 23. Thus, a one-watt input signal will be applied to the output coupler 23 with an attenuation of 10 db. The attenuation then increases to the maximum value.

In summary, the novel velocity-modulated electron beam coupling device described above is constructed with two or more aligned couplers and has at least two signal terminals. The coupling device has very small length and great ruggedness, and provides new efficient operation as a switch, a limiter, an isolator, a modulator, a multicoupler and as a small-signal nominal gain amplifier. These functions are all performed with rapid response and high efficiency over a broad range of radio frequencies.

The coupling device is extremely compact, and can be constructed with relative ease for high performance free from oscillation.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and secure by Letters Patent is:

1. A switching arrangement comprising a plurality of electron-beam coupling devices each including an input helical coupler and an output helical coupler isolated from each other, means directing an electron beam coaxially through said input and output helical couplers for inductively coupling them together, a signal generator, a first transmission path connecting said input helical couplers of each said device in series with said generator such as to receive a signal generated thereby, separate utilization devices connected to said output helical coupler of each said device, and keying means for enabling said electron beam directing means of selected ones of said devices to inductively couple said signal on said input helical couplers to said output couplers, the axial lengths of electron beam coupled input and output helical couplers being selected such that the signal level selectively received by said utilization devices corresponds to the signal level generated by said signal generator.

2. A switching arrangement comprising a plurality of electron-beam coupling devices each including an input helical coupler and an output helical coupler isolated from each other, means directing an electron beam coaxially through said input and output helical couplers for inductively coupling them together, a signal generator generating a signal, a divider network connecting said input helical couplers of each said device in parallel with said generator such as to receive said signal, separate utilization devices connected to said output helical coupler of each said device, and keying means for enabling said electron beam directing means of selected ones of said devices to inductively couple said signal on said input helical couplers to said output couplers, the axial lengths of electron beam coupled input and output helical couplers being selected such that the signal level selectively received by said utilization devices corresponds to the signal level generated by said signal generator.

3. A velocity-modulated electrom beam coupling device having an electron gun for projecting an electron beam, and a slow-wave circuit disposed along said beam for supporting a traveling wave and effecting distributed interaction between said electron beam and said traveling wave, said slow-wave circuit successively comprising an input coupler and an output coupler isolated therefrom, and being characterized in that:

(A) said input coupler includes a first helix
 (1) having a first end adjacent said electron gun and a second end adjacent said output coupler and
 (2) having a low loss parameter, a high increasing wave gain parameter, and a length along said electron beam on the order of 1.5 wavelengths at the center operating frequency;
(B) a first conductor in circuit with said second end of said first helix,
 (1) said input coupler by virtue of the short length of said first helix delivers to said first conductor, when said beam is present, a signal substantially identical to an input radio frequency signal applied to said first end of said first helix;
(C) said output coupler includes a second helix
 (1) having a third end adjacent to said first helix and a fourth end remote therefrom, and
 (2) having a low loss parameter, a high increasing wave gain parameter, and a length along said electron beam, on the order of 1.5 wavelengths at the center operating frequency;
(D) a second conductor in circuit with said second helix adjacent its fourth end,
 (1) whereby said beam, by virtue of the short length of said second helix, impresses on said output coupler, for delivery to said second conductor, a radio frequency signal substantially identical to the input radio frequency signal applied to said first end of said first helix.

4. The coupling device defined in claim 3 further characterized in that:

(A) beam power means are connected with said electron gun and selectively control the current density in said electron beam,
(B) the power level of the signal delivered to said second conductor
 (1) corresponds to the power level of input radio frequency signals applied to said first end of said first helix when the power level of said input signals are within a selected range determined by the beam current density, and
 (2) are less than the power level of input radio frequency signals whose power level exceeds said selected range.

5. The coupling device defined in claim 3 further characterized in that:

(A) beam switching means operable to turn said electron beam along said slow-wave circuit on and off are connected to a control grid in said electron gun.

6. In a radio frequency receiving system, the combination comprising:

(A) an antenna,
(B) a velocity-modulated electron beam coupling device,
 (1) an electron beam projecting electron gun in said coupling device having a control grid,
 (2) a slow-wave circuit in said coupling device disposed along said beam for distributed signal transferring interaction therewith, said slow-wave circuit successively comprising an input helix, an isolator, and an output helix,
  (a) said input helix having a first end adjacent said electron gun and a second end adjacent said isolator and having a low increasing wave loss parameter and high increasing wave gain parameter,
  (b) said antenna being connected with said first end of said input helix and delivering intercepted signals thereto,
  (c) said isolator terminating said second end of said input helix,
  (d) said output helix having a third end adjacent to and terminated by said isolator and a fourth end remote therefrom, and having a low increasing wave loss parameter, a high increasing wave gain parameter and short interaction length on the order of 1.5 wavelengths at the center operating frequency along said electron beam to provide nominal gain in said coupling device,
(C) a radio receiver connected with said fourth end of said output slow-wave circuit helix and receiving the radio frequency signal transferred to said output helix,
(D) beam switching means connected with said electron gun control grid and selectively biasing said grid to prevent said electron beam from being projected along said slow-wave circuit, thereby isolating said output helix and said receiver from radio frequency signals applied to said input helix, and
(E) beam control means connected with said electron gun and selectively controlling the current density of said electron beam to limit the maximum radio frequency signal power impressed on said output helix.

7. The combination defined in claim 6 in which said beam switching means biases said control grid for repetitively turning said beam on and off, thereby modulating the radio frequency signal impressed on said output helix of said slow-wave circuit.

(References on following page)

References Cited

UNITED STATES PATENTS

| | | | |
|---|---|---|---|
| 2,593,113 | 4/1952 | Cutler | 330—43 X |
| 2,733,305 | 1/1956 | Diemer | 315—3.6 X |
| 2,899,596 | 8/1959 | Johnson | 315—3.6 |
| 2,906,868 | 9/1959 | George | 315—39.3 X |
| 2,954,553 | 9/1960 | Gruenberg | 315—39.3 X |
| 3,024,384 | 3/1962 | Itzkan et al. | 315—3.6 |
| 3,027,453 | 3/1962 | Carter et al. | 315—3.6 X |
| 3,028,597 | 4/1962 | Cicchetti et al. | 315—3.6 X |
| 3,037,168 | 5/1962 | Forrer | 315—39.3 X |

ROBERT SEGAL, *Primary Examiner.*

JOHN W. CALDWELL, *Examiner.*

JAMES W. LAWRENCE, *Assistant Examiner.*